United States Patent
Amiya et al.

(10) Patent No.: US 8,982,382 B2
(45) Date of Patent: Mar. 17, 2015

(54) IMAGE FORMATION APPARATUS METHOD, AND RECORDING MEDIUM WITH EXTENDABLE AUTO CLEAR TIME

(75) Inventors: Koichi Amiya, Toyokawa (JP); Kentaro Nagatani, Toyokawa (JP); Tomoko Maruyama, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1252 days.

(21) Appl. No.: 12/480,120

(22) Filed: Jun. 8, 2009

(65) Prior Publication Data

US 2009/0316179 A1 Dec. 24, 2009

(30) Foreign Application Priority Data

Jun. 20, 2008 (JP) ................................ 2008-161265

(51) Int. Cl.
| | |
|---|---|
| G06F 3/12 | (2006.01) |
| G06K 15/00 | (2006.01) |
| G07F 17/00 | (2006.01) |
| G06Q 20/14 | (2012.01) |
| G06Q 20/28 | (2012.01) |
| G07F 17/26 | (2006.01) |

(52) U.S. Cl.
CPC .......... *G07F 17/0014* (2013.01); *G06Q 20/145* (2013.01); *G06Q 20/28* (2013.01); *G07F 17/266* (2013.01)
USPC ........................................ 358/1.15; 358/1.14

(58) Field of Classification Search
CPC ....... G06Q 20/14; G06Q 20/16; G06Q 20/18; G06Q 20/145; G06Q 20/28; G07F 17/0014
See application file for complete search history.

(56) References Cited

U.S. PATENT DOCUMENTS

| | | | | |
|---|---|---|---|---|
| 6,388,760 | B2 * | 5/2002 | Kadota et al. | 358/1.14 |
| 7,334,090 | B2 * | 2/2008 | Zellner | 711/154 |
| 2006/0187481 | A1 * | 8/2006 | Hayakawa | 358/1.14 |
| 2006/0279757 | A1 * | 12/2006 | Fukano | 358/1.13 |
| 2008/0030750 | A1 * | 2/2008 | Kato | 358/1.4 |
| 2008/0137138 | A1 * | 6/2008 | Matoba | 358/1.15 |

FOREIGN PATENT DOCUMENTS

| | | |
|---|---|---|
| EP | 1056030 A2 * | 11/2000 |
| JP | 2004-101765 A | 4/2004 |
| JP | 2005-141311 | 6/2005 |
| JP | 2006-004167 | 1/2006 |

OTHER PUBLICATIONS

Notification of Reasons for Refusal issued in the corresponding Japanese Patent Application No. 2008-161265 dated Jun. 15, 2010, and an English Translation thereof.

* cited by examiner

*Primary Examiner* — Benny Q Tieu
*Assistant Examiner* — Sunil Chacko
(74) *Attorney, Agent, or Firm* — Buchanan Ingersoll & Rooney PC

(57) ABSTRACT

The present invention relates to an image formation apparatus that discards a job on elapse of an auto clear time. In the case a job is interrupted due to an insufficient balance to pay the fee for the job, the image formation apparatus judges whether the cause of the interruption can be eliminated in a short time or it takes a long time to be eliminated. If the cause takes a long time to be eliminated, the image formation apparatus extends the auto clear time to prevent the job from being discarded for the reason that the user does not have enough time to pay an additional fee.

10 Claims, 12 Drawing Sheets

IMAGE FORMATION APPARATUS METHOD, AND RECORDING MEDIUM WITH EXTENDABLE AUTO CLEAR TIME

CROSS-REFERENCE TO RELATED APPLICATION

This application is based on an application No. 2008-161265 filed in Japan, the contents of which is hereby incorporated by reference.

BACKGROUND OF THE INVENTION (1) Field of the Invention

The present invention relates to an image formation apparatus, and particularly to improvement of auto clear processing performed by such an apparatus during a job pause.

(2) Description of the Related Art

Image formation apparatuses that have functions of a copier, a printer, a facsimile and so on are called "MFPs (Multifunction Peripherals)". MFPs are installed in offices and convenience stores for example, and shared among many users. There are many methods to bill usage fees of MFPs. For example, cash, prepaid cards, billing server registration, and MFP registration are used for the billing.

In the case of cash, a vendor (a cash payment machine) is set up besides the MFP, and users directly put cash into the machine. In the case of prepaid cards, a card reader is set up beside the MFP, and users pay the usage fee with money deposited in a prepaid card. In the case of the billing server registration, billing management for users registered in advance with a billing server connected to the MFP via a network is conducted on the billing server. In the case of the MFP registration, billing management for users registered in advance with the MFP is conducted by the MFP. In particular, the MFP registration is used for giving unlimited usage permission to the users registered with the MFP.

MFPs have a function to automatically discard jobs that have been interrupted for a prescribed period due to, for example, shortage of money required for printout, a paper feed error, an error in any of various devices included in the MFP, and a stop button pressed by the user. This function is called "auto clear", and the prescribed period before the auto clear is called "auto clear time". After a job is discarded by the auto clear, the user has to have the MFP read the document again to restart the job.

Patent Document 1 discloses a technique to enable an MFP to restart a job before discarding it when the user put an additional fee within the auto clear time.

Patent Document 1: Japanese Patent Application Publication NO. 2004-101765

SUMMARY OF THE INVENTION

As the various methods to bill usage fees are applicable to MFPs as mentioned above, time required for a user to pay the additional fee is different among the methods. For example, in the case of cash, the user only has to take out money from his/her purse and enter the money into the vendor. Therefore, the user can pay the additional fee in a relatively short period. However, in the case of the billing server registration, the user has to access the billing server from a terminal apparatus, and change the allowable upper limit of the total amount of fees for the user. This requires a relatively long time. Also, in the case of prepaid cards, a money charger for replenishing a prepaid card is not necessarily near the MFP. The user has to go away from the MFP in some cases, and the user might require a longer time than the case of cash.

Meanwhile, as mentioned above, jobs are interrupted not only due to the insufficient balance but also at a paper feed error, an error in any of various devices, and an intentional stop operation by the user. In such cases, the user is not required to pay an additional fee, the auto clear time is not required to be long.

An object of the present invention is to provide an image formation apparatus that is capable of preventing a job from being discarded because of insufficient time for the user to pay an additional fee in the case the job has been interrupted due to the insufficient balance, without securing an unnecessarily long auto clear time.

The above object is fulfilled by an image formation apparatus that discards a job on elapse of an auto clear time when an interruption occurs in execution of the job, the image formation apparatus comprising: a judgment part operable to judge whether a cause of the interruption is one of prescribed causes; and a setting changer operable, if the judgment part judges that the cause of the interruption is one of the prescribed causes, to change the auto clear time to be longer than when the judgment part judges not, wherein the prescribed causes are considered to take a long time to be eliminated.

With the stated structure, even if a job is interrupted in the execution of the job, the image formation apparatus can change the auto clear time depending on whether the cause of the interruption can be immediately removed or not. With respect to a cause that is expected to take a long time to be removed, the image formation apparatus changes the auto clear time to be long in order to prevent the job from being discarded before the user removes the cause of the interruption. As a result, to resume the interrupted job, it is unnecessary for the user to restart from the scanning of the document.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the Drawings.

DESCRIPTION OF THE PREFERRED EMBODIMENT

<First Embodiment>

This section describes a case where an image formation apparatus is connected to a vendor, into which a user enters cash, and a billing server, which performs billing management. In this embodiment, the auto clear time to be used at the time the balance becomes insufficient is changed depending on whether the method to bill is the cash method or the billing server registration method. When a job is interrupted for any reason other than the insufficient balance, the image formation apparatus performs the normal auto clear processing.

<Structure>
<Overall Structure>

Figure 1:
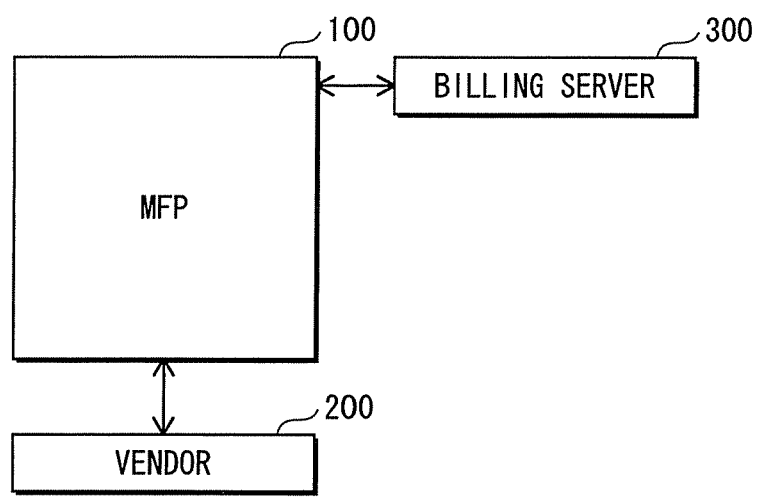
FIG. 1 shows an overall structure of a first embodiment of the present invention.

FIG. 1 shows an overall structure of the first embodiment. In FIG. 1, an MFP 100 is the image formatting apparatus, and locally connected with a vendor 200 via a serial line or the like. The MFP 100 is also connected with a billing server 300 via a network. The billing server 300 can be used from other MFPs and PCs if connected to the network. However, it may be locally connected to the MFP via USB or the like.

<Hardware Structure of MFP 100>

Figure 2:
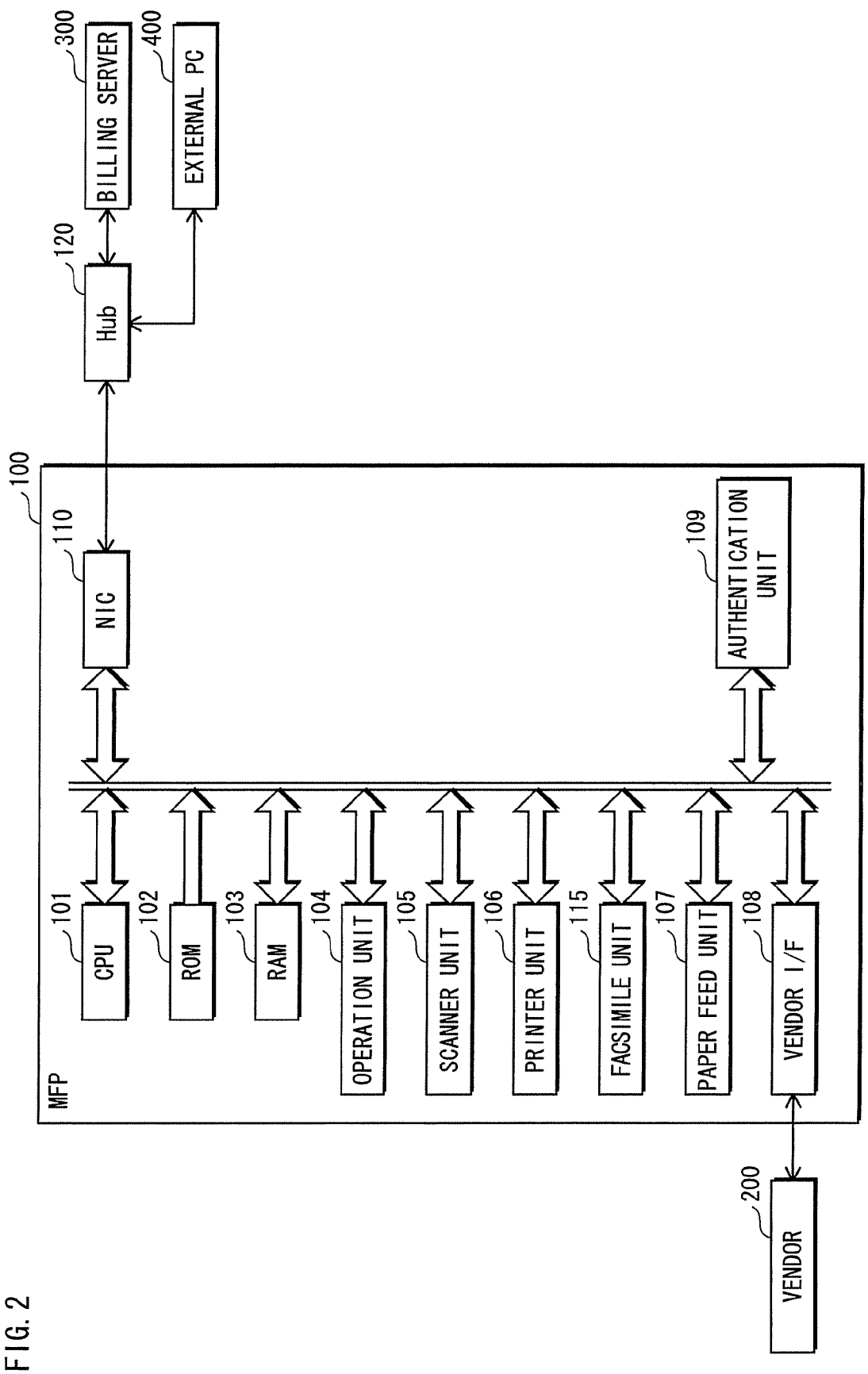
FIG. 2 shows a hardware structure of an MFP pertaining to the present invention.

FIG. 2 shows a hardware structure of the MFP 100. The MFP 100 includes a CPU 101, a ROM 102, a RAM 103, an operation unit 104, a scanner unit 105, a printer unit 106, a paper feed unit 107, a vendor I/F 108, an authentication unit 109, an NIC 110, and a facsimile unit 115.

The CPU 101 is a processor that reads a program from the ROM 102, and realizes functions of the MFP 100, such as image formation, job management, and communications with the vendor and the billing server.

The ROM 102 stores therein a program that describes processing such as printing performed by the MFP, document scanning, copying, and communications with the vendor and the billing server. The flowcharts of FIG. 5 to FIG. 8 show examples of such processing. FIG. 5 to FIG. 8 will be explained below.

The RAM 103 stores therein data of scanned documents, image data, setting information of jobs, and so on.

Figure 4:
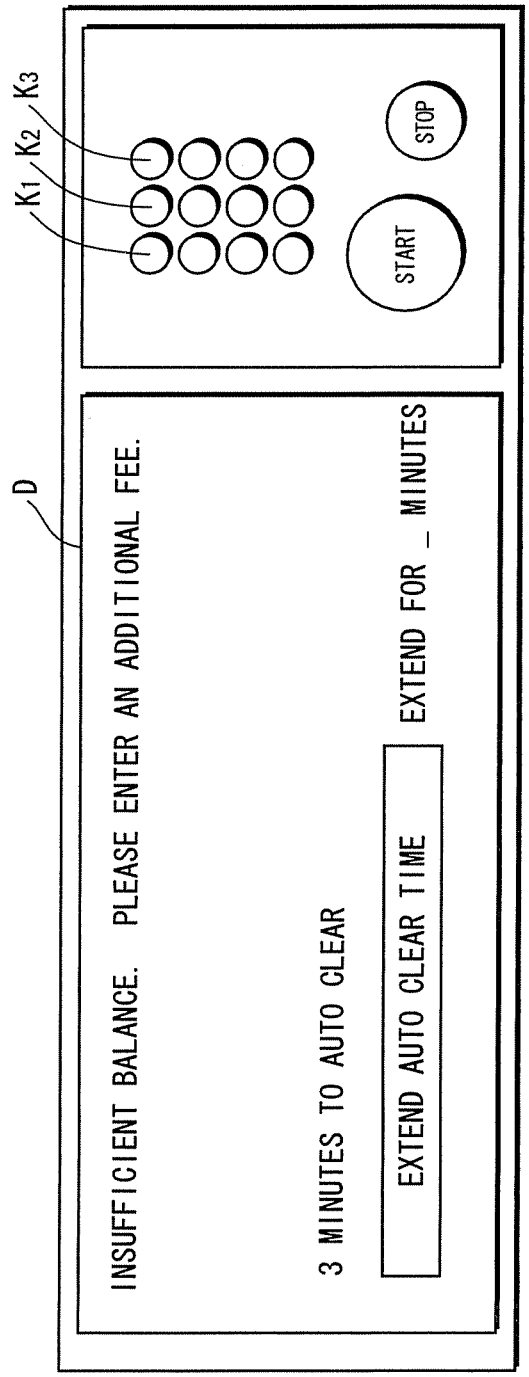
FIG. 4 shows an operation unit of an MFP pertaining to the present invention.

The operation unit 104 is structured from buttons to be operated by a user, a panel, and son. For example, the operation unit 104 includes a panel from which the user inputs job settings, such as a paper setting and the number of prints, a start button with which the user starts an job, a stop button with which the user stops a job, and a display. If the balance becomes insufficient during execution of a job, the operation unit 104 displays a message for prompting the user to enter an additional fee on the display D, as FIG. 4 shows. In this drawing, the display D is also displaying the auto clear time. The user can extend this auto clear time, which has been determined to be three minutes, by manually inputting a time through operations of function keys K1, K2, K3, etc.

Back in FIG. 2, the scanner unit 105 scans a document, and a processing unit for generating image data sends the read image data of the document to the RAM 103. The CPU 101 operates according to the program that is currently being executed, and as a result, for example, the image data is printed out by the printer unit 106, or transmitted to an external PC 400 via the communication interface NIC 110.

The printer unit 106 prints out image data stored in the RAM 103, according to an instruction from the CPU 101.

The facsimile unit 115 transmits image data stored in the RAM 103 by facsimile, according to an instruction from the CPU 101.

The paper feed unit 107 feeds sheets of paper in accordance with the job setting, for printing by the printer unit 106.

The vendor I/F 108 communicates with the vendor 200. That is, at every printing, the vendor I/F 108 requests the vendor 200 to subtract a fee required for the printing from the amount of money entered into the vendor 200. If receiving a signal showing the insufficient balance from the vendor 200, the vendor I/F 108 notifies the CPU 101 of the insufficient balance.

The authentication unit 109 judges whether the user is an MFP registration user, or a billing server registration user, or none of them. An MFP registration user is a user whose billing management is performed by the MFP 100. A registered user is authenticated based on an ID and so on that the user inputs at the job setting. With this structure, it is possible to permit specific users within an office to use the MFP without limit i.e. without charging a fee. On the other hand, it is possible to charge the other users a fee, without charging the specific users. An example of the use of the MFP registration user is explained below as another embodiment.

The NIC 110 is an interface for connecting to the billing server 300 located on the network.

An external PC 400 is also connected to the network via a hub 120. The external PC 400 can perform printing with use of the MFP 100 via the network.

<Functional Structure of MFP 100>

Figure 3:
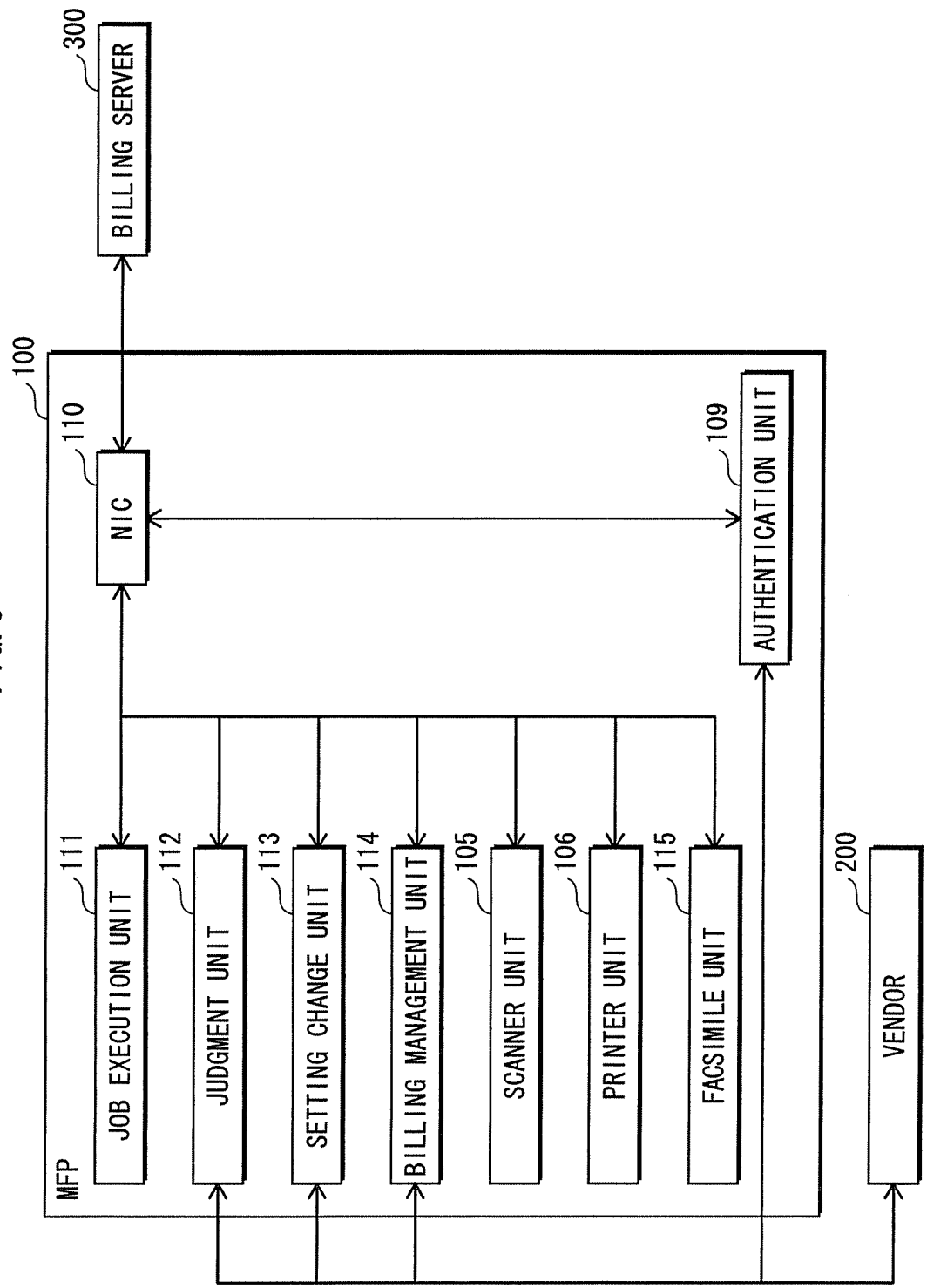
FIG. 3 shows a functional structure of an MFP pertaining to the present invention.

The following explains the functions that are realized by the CPU 101 operating in accordance with a control program stored in the ROM 102. FIG. 3 shows the functional structure of the MFP 100. The MFP 100 includes a job execution unit 111, a judgment unit 112, a setting change unit 113, a billing management unit 114, a scanner unit 105, a printer unit 106, a facsimile unit 115, an authentication unit 109, and an NIC (Network Interface Card) 110. The MFP 100 has a structure in which, when a job being executed by the job execution unit 111 such as a copy job is interrupted, the judgment unit 112 judges the billing method in use, based on the management information that is under management of the billing management unit 114, and the setting change unit 113 changes the setting of the auto clear time based on the billing method.

The job execution unit 111 executes jobs instructed by the user, such as copying and printing. At every execution of a job, the job execution unit 111 instructs the billing management unit 114 to charge the fee for the execution of the job. The job execution unit 111 interrupts a job when notified by the billing management unit 114 of the insufficient balance. The job execution unit 111 also interrupts a job when an error such as a paper feed error and an error in any of various devices occurs, when the stop button is pressed by the user, and so on.

The judgment unit 112 judges, when a job is interrupted, whether it takes a long time to eliminate the cause of the interruption. The judgment unit 112 notifies the setting change unit 113 of the result of the judgment.

The setting change unit 113 changes the setting of the auto clear time according to the result of the judgment by the judgment unit 112. In the case the judgment unit 112 judges that it takes a long time to eliminate the cause of the interruption, the setting change unit 113 sets a longer auto clear time than that in the case the judgment unit 112 judges that it does not takes a long time.

The billing management unit 114 compares the amount of the fee for a job with the amount of the cash entered into the vendor 200 and the allowable upper limit under management of the billing server 300 to check whether the balance has become insufficient. In the case of the insufficient balance, the billing management unit 114 instructs the job execution unit 111 to interrupt the job. Also, the billing management unit 114 memorizes whether the billing method is the vendor method (using cash and prepaid cards) or the billing server registration user method or the MFP registration user method. The billing management unit 114 notifies the judgment unit 112 of the current billing method, in response to an inquiry from the judgment unit 112.

The scanner unit 105, the printer unit 106, the facsimile unit 115, the authentication unit 109, and the NIC 110 have the functional structures described above.

<Operations>

Figure 5:
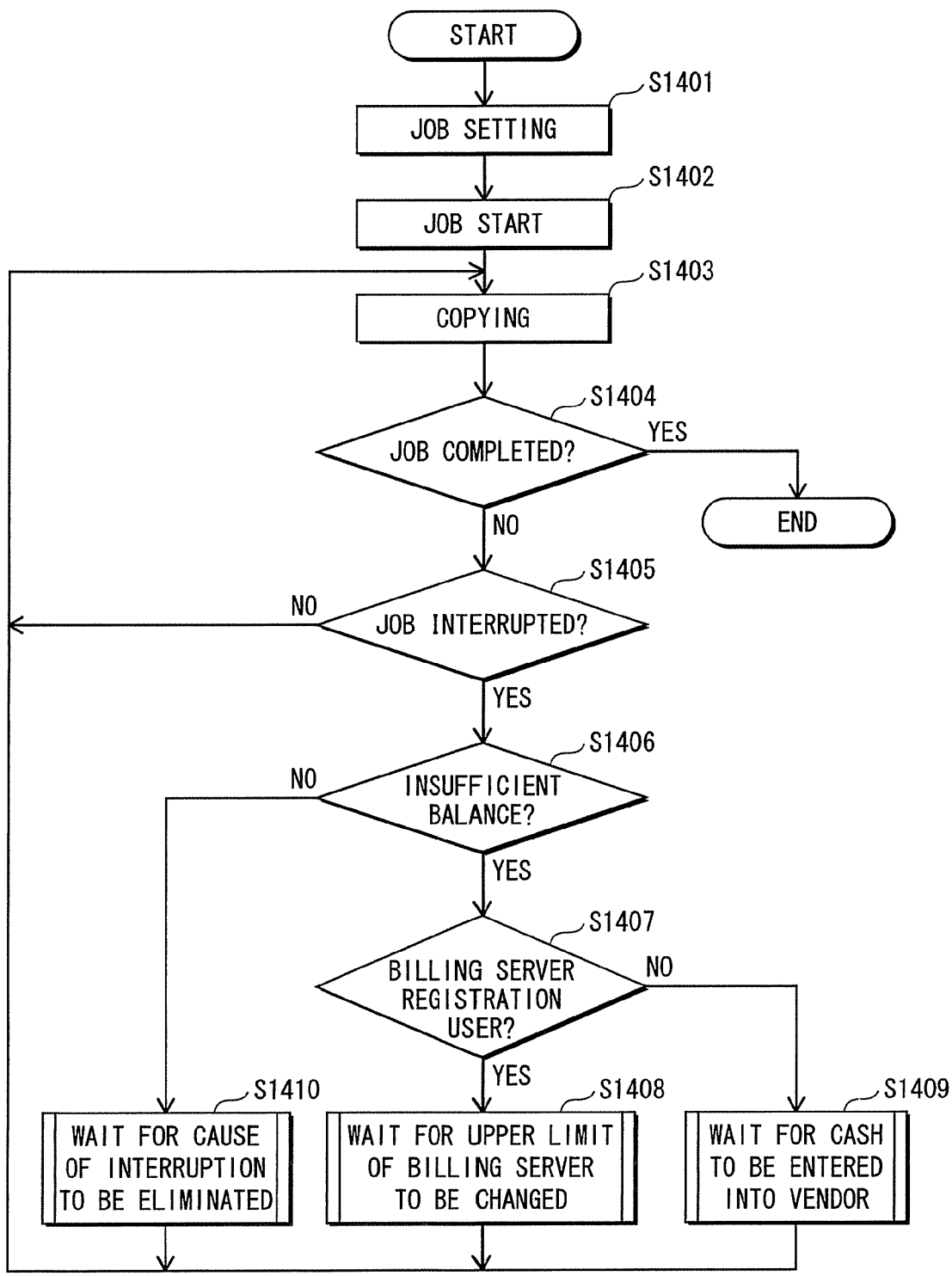
FIG. 5 is a flowchart showing operations performed by an MFP pertaining to the first embodiment of the present invention.

The following explains the operations of the MFP 100 pertaining to this embodiment, with reference to the flowchart of FIG. 5. It is assumed here that the user uses the MFP 100 for copying.

Firstly, after setting a document to be copied on the scanner unit 105, the user determines the job setting (S1401). Job setting is, for example, setting of the size and the orientation of copier paper, the number of copies, and so on. Here, in the case where the user is a registered user of the billing server 300 or the MFP 100, the user also inputs his/her ID and password.

After completing the job setting, the user starts the job (S1402). Here, the job start means that the user presses the start button.

When the user presses the start button, the MFP 100 drives the scanner unit 105 to scan the document, and subsequently, performs the image formation based on the scanned document (S1403). The image formation is, for example, processing for obtaining images by electrostatic copying, that is, by creating, transferring and fixing toner images on a sheet of plain paper, based on the scanned document.

The MFP 100 continues the printing until the requested number of copies are made as to all the original documents (i.e. until completion of the execution of the job). On completion of the execution of the job (S1404 Y), the program finishes the processing. On the other hand, if the job has not been completed (S1404 N), the MFP 100 will perform different processing between in the case where the job has been interrupted (copy stop) and in the case where the job has not been interrupted. That is, if the job has not been interrupted (S1405 N), the MFP 100 repeats the copy processing (S1403) until completion of the execution of the job.

On the other hand, if the job has been interrupted (S1405 Y), the MFP 100 judges whether the cause of the interruption is the insufficient balance or not (S1406). In the case where the cause is the insufficient balance, the MFP 100 classifies the cause of the interruption into a first group, which is a group of causes that take a long time to be eliminated. In the case where the cause is not the insufficient balance, the MFP 100 classifies the cause of the interruption into a second group, which is a group of causes that do not take a long time to be eliminated.

In the case where the cause is the insufficient balance (S1406 Y), the MFP 100 judges whether the billing method is the billing server registration user method (S1407). This judgment is made based on the ID of the billing server registration user input at the time of the job setting.

If the billing method is the billing server registration user method (S1407 Y), the MFP 100 waits for the upper limit of the billing server to be changed to increase (S1408), because the insufficient balance means that the money used by the user has reached the allowable upper limit of the billing server. The waiting for the upper limit to be changed will be explained later. After changing the upper limit, the MFP 100 returns to the copying (S1403), and restarts the execution of the job.

If the billing method is not the billing server registration user method (S1407 N), the insufficient balance means that the MFP 100 has used up the cash entered into the vendor for the copying. Therefore, the MFP 100 waits for cash to be entered into the vendor (S1409). The waiting for cash to be entered into the vendor (S1409) will be explained later. When cash is entered into the vendor, the MFP 100 returns to the copying (S1403), and restarts the job.

If the cause of the job interruption is not the insufficient balance (S1406 N), it can be assumed that the job has been interrupted because of a paper feed error or an error in any of the various devices included in the MFP 100, or because the user pressed the stop button to intentionally interrupt the job. In these cases, the MFP 100 waits for the cause of the interruption to be eliminated (S1410). The waiting for the cause of the interruption to be eliminated will be explained later. After the cause is eliminated, the MFP 100 returns to the copying (S1403), and restarts the job.

<Waiting for Allowable Upper Limit of Billing Server to be Changed>

Figure 6:
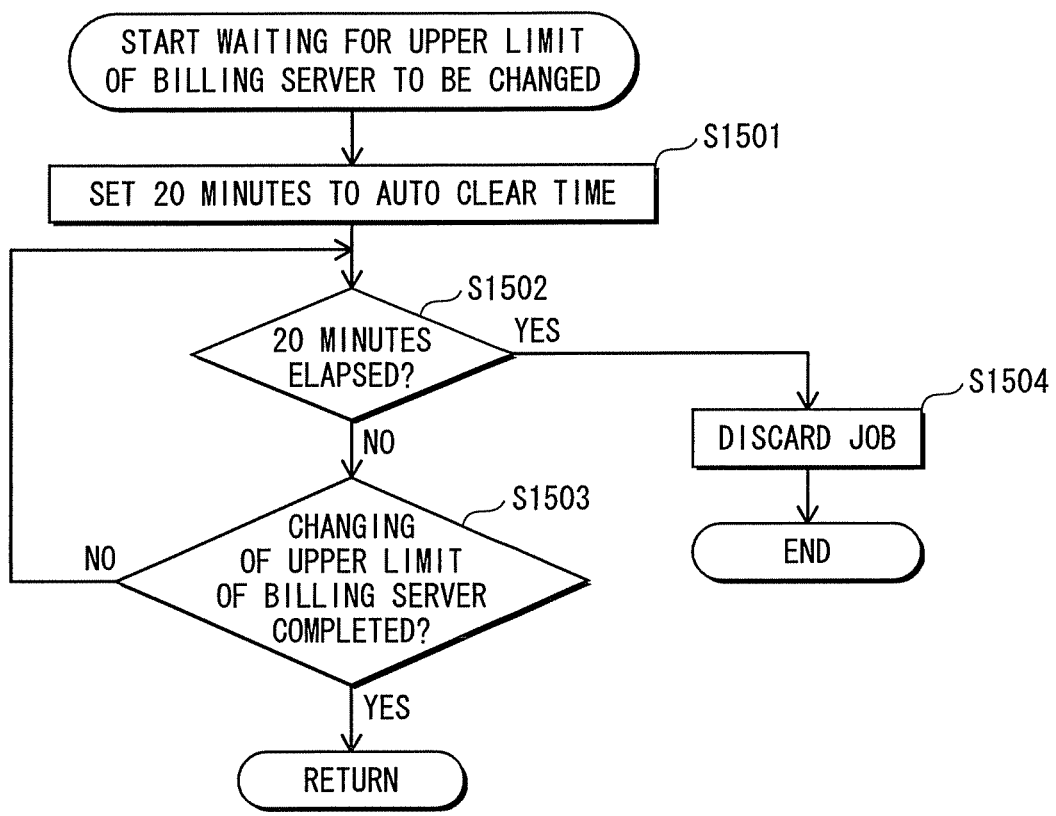
FIG. 6 is a flowchart showing operations performed by an MFP pertaining to the present invention while waiting for an allowable upper limit that has been set to a billing server to be changed.

This section explains the processing of waiting for the upper limit of the billing server to be changed shown in FIG. 5 (S1408), with reference to the flowchart of FIG. 6.

In the case the billing method is the billing server registration user method, a relatively long period (e.g. 20 minutes) is set to the auto clear time (S1501) to prevent the job from being discarded, because it takes a long time for the user to be allowed to make a change to the upper limit and the upper limit be actually changed.

After that, the MFP 100 repeats judging whether the changing of the upper limit of the billing server has been completed (S1503) for 20 minutes (S1502 N). If judging that the changing has been completed (S1503 Y), the MFP 100 returns to S1408 of FIG. 5, which is the caller of this processing. If the changing of the upper limit of the billing server has not been completed (S1503 N) when 20 minutes has elapsed (S1502 Y), the MFP 100 discards the job (S1504) and finishes the printing.

<Waiting for Cash to be Entered into Vendor>

Figure 7:
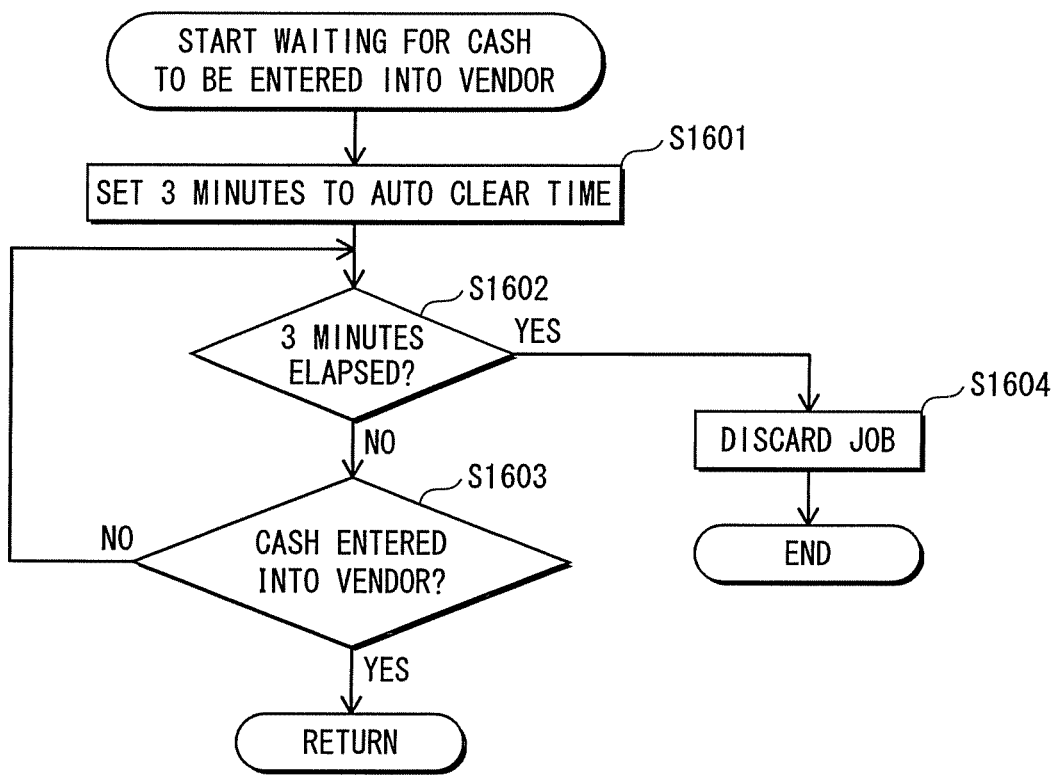
FIG. 7 is a flowchart showing operations performed by an MFP pertaining to the present invention while waiting for cash to be entered into a vendor.

This section explains the processing of waiting for cash to be entered into the vendor shown in FIG. 5 (S1409), with reference to the flowchart of FIG. 7.

In the case the billing method is the cash method, the user requires only a short time to pay the additional fee by entering coins or bills into the vendor. Therefore, it is unlikely that the job will be discarded even if a relatively short time has been set to the auto clear time. In this embodiment, 3 minutes is set to the auto clear time (S1601).

After that, the MFP 100 repeats judging whether the cash has been entered into the vendor (S1603) for 3 minutes (S1602 N). If judging that cash has been entered (S1603 Y), the MFP 100 returns to S1409 of FIG. 5, which is the caller of this processing. If cash has not been entered into the vendor (S1603 N) when 3 minutes has elapsed (S1602 Y), the MFP 100 discards the job (S1604) and finishes the printing.

<Waiting for Cause of Interruption to be Eliminated>

Figure 8:
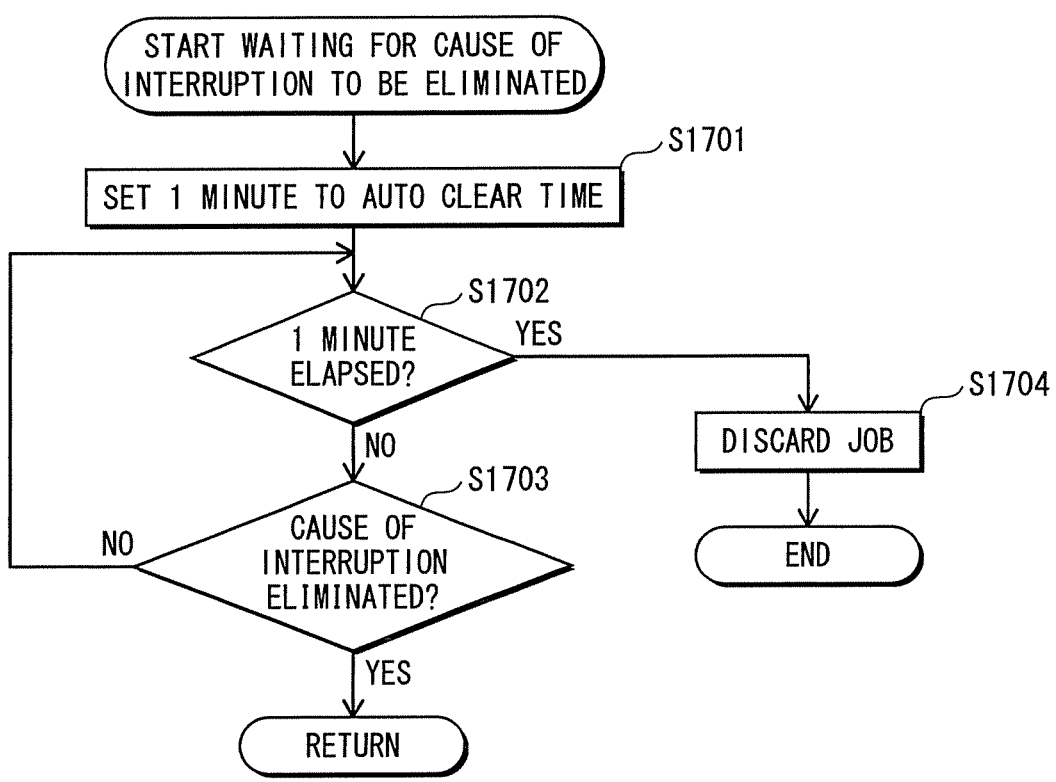
FIG. 8 is a flowchart showing operations performed by an MFP pertaining to the present invention while waiting for a cause of interruption to be eliminated.

This section explains the processing of waiting for the cause of the interruption to be eliminated shown in FIG. 5 (S1410), with reference to the flowchart of FIG. 8.

If the cause of the job interruption is not the insufficient balance, it can be assumed that the job has been interrupted because of a paper feed error or an error in any of the various devices included in the MFP 100, or because the user pressed the stop button to intentionally interrupt the job.

In these cases, it is unnecessary to wait for the additional fee to be paid or the upper limit to be changed. Therefore, it is possible to set a shorter time to the auto clear time than the case of the above two cases. In this embodiment, 1 minute is set to the auto clear time (S1701).

After that, the MFP 100 repeats judging whether the cause of the interruption has been eliminated (S1703) for 1 minute (S1702 N). If judging that the cause has been eliminated (S1703 Y), the MFP 100 returns to S1410 of FIG. 5, which is the caller of this processing. If the cause has not been eliminated (S1703 N) when 1 minute has elapsed (S1702 Y), the MFP 100 discards the job (S1704) and finishes the printing.

Here, to eliminate the cause of the interruption means, in the case of the paper feed error for example, to add paper or to fix a paper jam.

<Advantageous Effects>

As explained above, the MFP 100 judges whether the billing method requires a long time to eliminate the cause of the interruption. Accordingly, the MFP 100 can set an appropriate value to the auto clear time depending on the billing method even if the time required for the user to resolve the insufficient balance is different depending on the billing method.

In particular, it is possible to set a different time to the auto clear time used at the time of the insufficient balance between the case where the job has been requested by a billing server registration user and the case where the user has entered cash into the vendor. To resolve the insufficient balance, a billing server registration user is required to make a request for changing the upper limit to the billing server, and to be given permission. This takes a longer time than entering an additional fee into the vendor. Therefore, a long time will be set to the auto clear time to prevent the job from being discarded.

Also, the MFP 100 can change the setting of the auto clear time depending on whether the cause of the interruption is the in sufficient balance or not. If the cause of the interruption is the insufficient balance, the user requires a time to pay the additional fee. Therefore, a long time will be set to the auto clear time to prevent the job from being discarded.

[Second Embodiment]

This embodiment explains a case where the image formation apparatus is connected only to the billing server that performs the billing management. The structure of the image formation apparatus pertaining to the second embodiment is the same as the structure of the first embodiment except for that the vender into which the user enters cash is not included. The ROM 102 stores therein a program used for performing the operations shown in the flowchart of FIG. 9.

Figure 9:
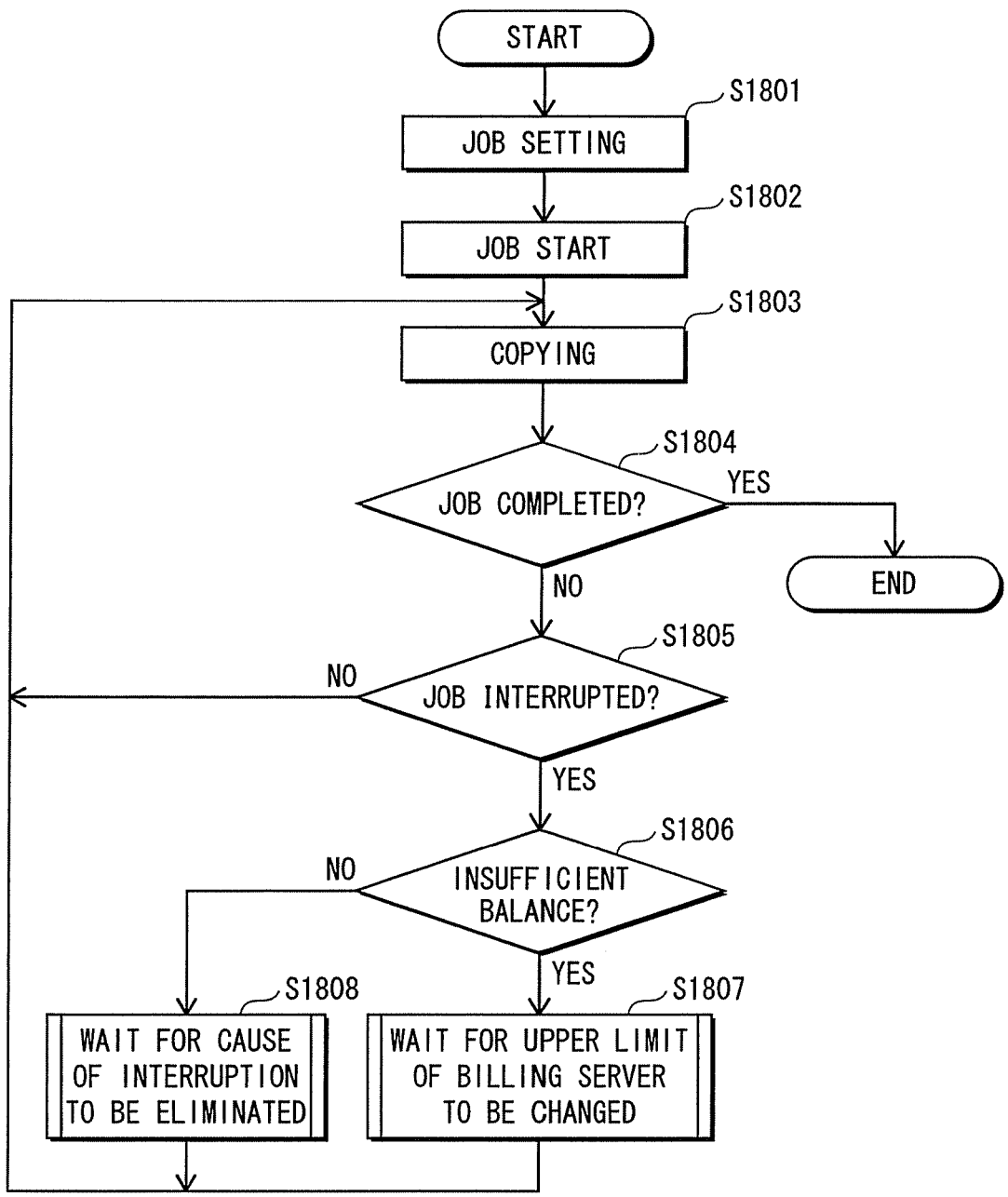
FIG. 9 is a flowchart showing operations performed by an MFP pertaining to a second embodiment of the present invention.

FIG. 9 is a flowchart showing operations of the MFP pertaining to this embodiment. This flowchart is different from the first embodiment only in the following: When the job is interrupted (S1805 Y) and the insufficient balance occurs (S1806 Y), the MFP immediately moves to the processing of waiting for the upper limit of the billing server to be changed (S1807), because only the billing server registration user method is used in this embodiment. In the processing of waiting for the upper limit of the billing server to be changed (S1807) and the processing of waiting for the cause of the interruption to be eliminated (S1808), 20 minutes and 1 minute are set to the auto clear time respectively, as explained with reference to FIG. 6 and FIG. 8.

[Third Embodiment]

This embodiment explains a case where the MFP is connected only to the vendor into which the user enters cash and the MFP has a function to register users therewith. In this embodiment, it is assumed that the MFP registration users can use the MFP unlimitedly without paying any fee. The structure of the MFP pertaining to the third embodiment is the same as the structure of the first embodiment except for that the billing server that performs the billing management is not included. The ROM 102 stores therein a program used for performing the operations shown in the flowchart of FIG. 10.

Figure 10:
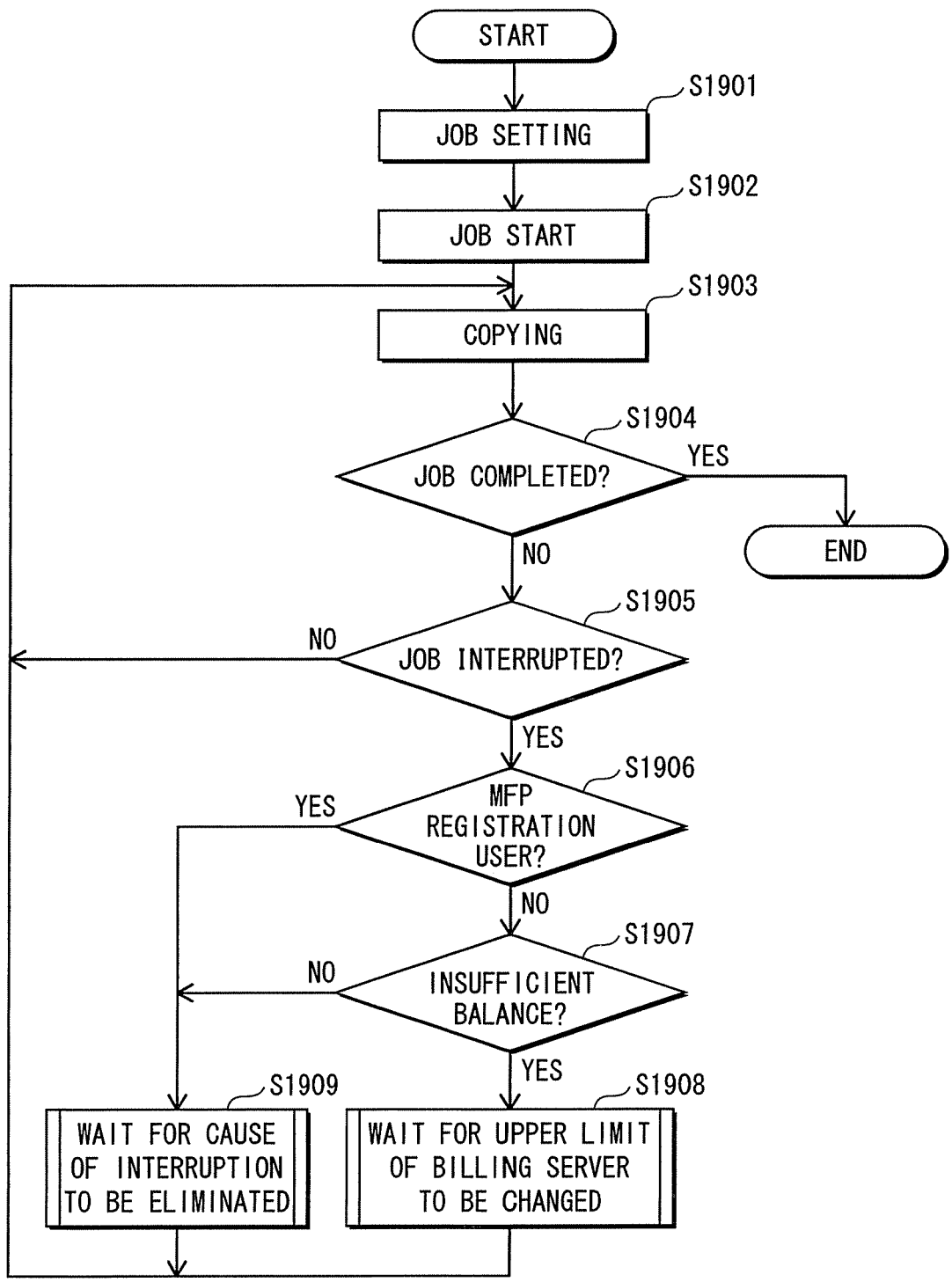
FIG. 10 is a flowchart showing operations performed by an MFP pertaining to a third embodiment of the present invention.

FIG. 10 is a flowchart showing operations of the MFP pertaining to this embodiment. This flowchart is different from the first embodiment only in the following: After the job is interrupted (S1905 Y), if the user is the MFP registration user (S1906 Y), the MFP waits for the cause of the interruption to be eliminated (S1909) because the job can not be interrupted due to the insufficient balance. If the user is not the MFP registration user (S1906 N), the MFP judges whether the cause of the interruption is the insufficient balance (S1907). If the cause of the interruption is the insufficient balance, the MFP waits for cash to be entered into the vendor (S1908). If the cause of the interruption is not the insufficient balance, the MFP waits for the cause of the interruption to be eliminated (s1909).

In the processing of waiting for cash to be entered into the vendor (S1908) and the processing of waiting for the cause of the interruption to be eliminated (S1909), 3 minutes and 1 minute are set to the auto clear time respectively, as explained with reference to FIG. 7 and FIG. 8.

[Fourth Embodiment]

This embodiment explains a case where the MFP is connected to the card reader to which a prepaid card is to be inserted and the vendor to which cash is to be entered. The structure of the MFP pertaining to the fourth embodiment is the same as the structure of the first embodiment except for that the card reader to which a prepaid card is to be inserted is connected in addition to the vendor to which cash is to be entered. The ROM 102 stores therein a program used for performing the operations shown in the flowchart of FIG. 11.

Figure 11:
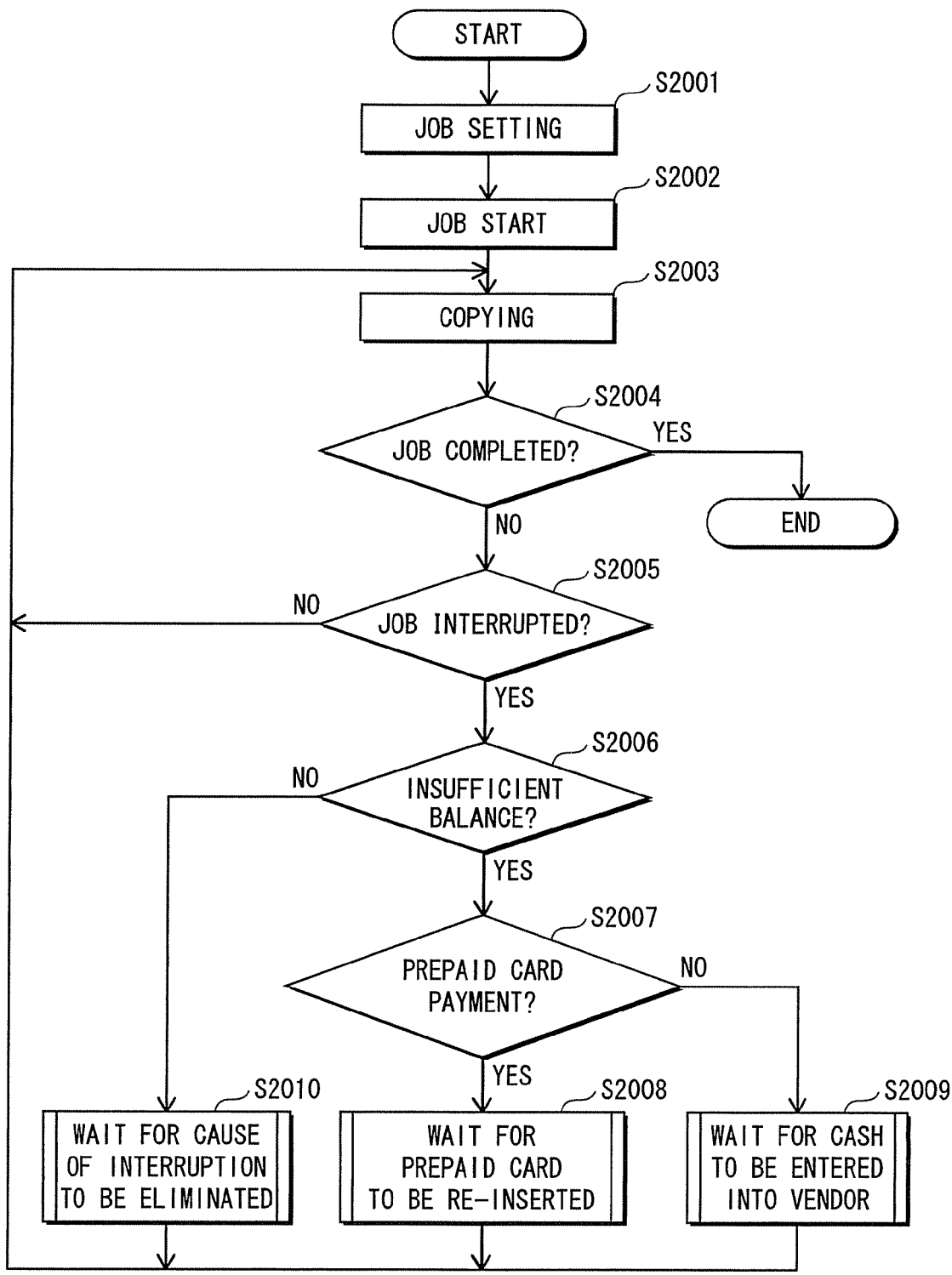
FIG. 11 is a flowchart showing operations performed by an MFP pertaining to a fourth embodiment of the present invention.

FIG. 11 is a flowchart showing operations of the MFP pertaining to this embodiment. This flowchart is different from the first embodiment only in the following: If the insufficient balance occurs (S2006 Y), the MFP judges whether the billing method is the prepaid card method or not (S2007). If the billing method is the prepaid card method (S2007 Y), the MFP waits for a prepaid card to be re-inserted (S2008). If the billing method is not the prepaid card method (S2007 N), the MFP waits for cash to be entered into the vendor (S2009).

The processing of waiting for the cash to be entered into the vendor (S2009) and the processing of waiting for the cause of the interruption to be eliminated (S2010) are the same as those explained with reference to FIG. 6 and FIG. 8.

<Waiting for Prepaid Card to be Re-Inserted>

Figure 12:
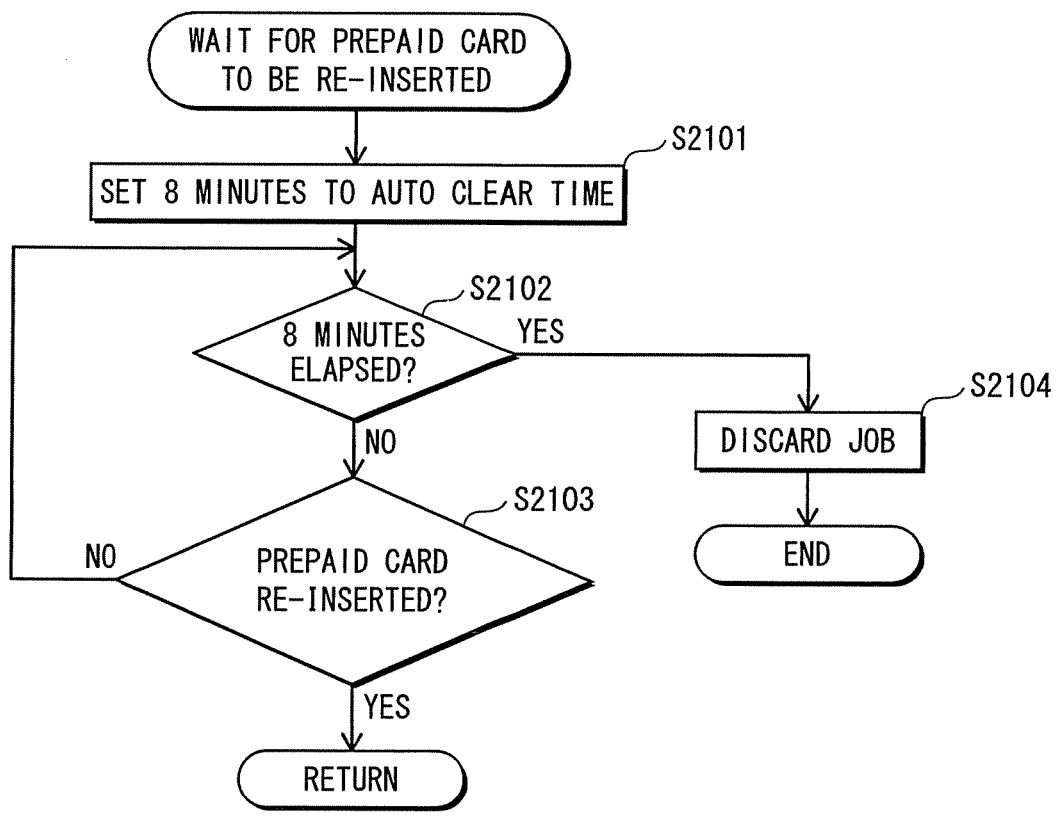
FIG. 12 is a flowchart showing operations performed by an MFP pertaining to the present invention when waiting for a prepaid card to be re-inserted.

This section explains the processing of waiting for a prepaid card to be re-inserted shown in FIG. 11 (S2008), with reference to the flowchart of FIG. 12.

In the case the billing method is the prepaid card method, the user can immediately re-insert a prepaid card with sufficient balance if the user has it. However, if the user does not have it, the user needs to buy a new prepaid card, or replenish the balance of his/her prepaid card. If the prepaid card is of an uncommon type, it is sometimes difficult for the user to immediately replenish the balance. Also, if where the user can replenish the balance is a little distance away from the MFP, it is necessary to set a relatively long time to the auto clear time in order to prevent that the auto clear is performed while the user is away from the MFP to replenish the balance. Therefore, in the case the billing method is the prepaid card method, the MFP can classify the cause of the interruption into a third group, which uses an auto clear time whose length is between the lengths of those used by the first group and the second group. In this embodiment, 8 minutes is set to the auto clear time (S2101).

After that, the MFP repeats judging whether the prepaid card has been re-entered (S2103) for 8 minutes (S2102 N). If judging that the prepaid card has been re-entered (S2103 Y), the MFP returns to S2008 of FIG. 11, which is the caller of this processing. If the prepaid card has not been re-entered (S2103 N) when 8 minutes has elapsed (S2102 Y), the MFP discards the job (S2104) and finishes the printing.

As described above, according to each of the embodiments, the MFP changes the auto clear time according to whether the cause of the interruption of a job is the insufficient balance. If the cause is the insufficient balance, the MFP changes the auto clear time according to the billing method. Further, in the case of system errors not caused by the insufficient balance, such as a paper jam, the MFP changes the auto clear time accordingly. Therefore, it is possible to prevent the job from being discarded while, for example, the user is paying the additional fee, and fulfill the object. Note that the present invention is not limited to the embodiments described above. It may be modified within the scope of the object of the present invention. In particular, the changing of the auto clear time does not depend only on the types of the billing methods described above. It is only necessary to change the auto clear time depending on whether it takes a long time to eliminate the cause of the interruption.

Note that although a copy job is taken as an example in the embodiments 1 to 4 above, the present invention is applicable to a print job, a facsimile job, and so on.

<Advantageous Effects>

As described above, the MFP is enabled to change the auto clear time according to the three levels. Accordingly, if the time required for eliminating the cause of the interruption is between the short time and the long time, the MFP sets an intermediate time to the auto clear time. As a result, it is possible to prevent the job from being discarded, without taking an unnecessarily long waiting time before the discard.

In particular, it is possible to determine the auto clear time for the case where the billing method is the prepaid card method to be shorter than that for the billing server registration user method and longer than that for the cash method. As a result, it is possible to prevent the job from being discarded even if the replenishing the balance of the prepaid card takes a longer time than a time required for entering cash.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image formation apparatus comprising:
    a processor for executing computer-executable instructions;
    a memory for storing said computer-executable instructions, the memory being accessible to said processor, said computer-executable instructions including:
    a judgment part operable to automatically judge, when an image forming process of a job is interrupted after a start of execution of the job, whether a cause of the interruption is one of prescribed causes, the prescribed causes considered to take longer to be eliminated than causes that are not prescribed;
    a setting changer operable, when the judgment part judges that the cause of the interruption is one of the prescribed causes, to change an auto clear time to be longer than when the judgment part judges that the cause of the interruption is not one of the prescribed causes; and
    a job discarder that discards the job on elapse of the auto clear time.

2. The image formation apparatus of claim 1, wherein
    the judgment part judges whether the cause of the interruption belongs to a first group that is constituted of the prescribed causes or a second group that is constituted of other causes, and
    when the judgment part judges that the cause of the interruption belongs to the first group, the setting changer changes the auto clear time to be longer than when the judgment part judges that the cause of the interruption belongs to the second group.

3. The image formation apparatus of claim 2, wherein
    both the first group and the second group relate to an insufficient balance to pay a fee for the job,
    the first group relates to an insufficient balance caused in a case the job has been requested by a billing server registration user, and
    the second group relates to an insufficient balance caused in a case the job has been requested by a user who has entered cash in a fee payment machine.

4. The image formation apparatus of claim 2, wherein
    the first group relates to an insufficient balance to pay a fee for the job and the second group relates to a cause other than an insufficient balance.

5. The image formation apparatus of claim 2, wherein
    the judgment part judges whether the cause of the interruption belongs to the first group, the second group, or a third group that is a group of causes that are considered to take a time shorter than the causes of the first group and longer than the causes of the second group to be eliminated, and
    when the judgment part judges that the cause of the interruption belongs to the third group, the setting changer changes the auto clear time to be shorter than when the judgment part judges that the cause belongs to the first group and longer than when the judgment part judges that the cause belongs to the second group.

6. The image formation apparatus of claim 5, wherein
    all the first group, the second group and the third group relate to an insufficient balance to pay a fee for the job,
    the first group relates to an insufficient balance caused in a case the job has been requested by a billing server registration user,
    the second group relates to an insufficient balance caused in a case the job has been requested by a user who has entered cash in a fee payment machine, and
    the third group relates to an insufficient balance caused in a case the job has been requested by a user who has inserted a prepaid card into a card reader.

7. The image formation apparatus of claim 1, wherein
    the prescribed causes are determined in advance according to a billing method adopted in the image formation apparatus.

8. The image formation apparatus of claim 1, wherein the setting changer automatically changes the auto clear time when the judgment part judges that the cause of the interruption is one of the prescribed causes.

9. An image formation method executed by an image formation apparatus comprising a processor for executing computer-executable instructions, said image formation method comprising:
- a judgment step of automatically judging, when an image forming process of a job is interrupted after a start of execution of the job, whether a cause of the interruption is one of prescribed causes, the prescribed causes considered to take longer to be eliminated than causes that are not prescribed;
- a setting change step of, when the judgment step judges that the cause of the interruption is one of the prescribed causes, changing an auto clear time to be longer than when the judgment step judges that the cause of the interruption is not one of the prescribed causes; and
- a job discarding step that discards the job on elapse of the auto clear time.

10. A non-transitory computer-readable recording medium on which is recorded an image formation program, the image formation program comprising:
- a judgment step of automatically judging, when an image forming process of a job is interrupted after a start of execution of the job, whether a cause of the interruption is one of prescribed causes, the prescribed causes considered to take longer to be eliminated than causes that are not prescribed;
- a setting change step of, when the judgment step judges that the cause of the interruption is one of the prescribed causes, changing an auto clear time to be longer than when the judgment step judges that the cause of the interruption is not one of the prescribed causes; and
- a job discarding step of discarding the job on elapse of the auto clear time.

* * * * *